(12) United States Patent
Stephens et al.

(10) Patent No.: US 11,973,234 B2
(45) Date of Patent: Apr. 30, 2024

(54) ASSEMBLY FACILITATING THE GENERATION OF VAPOR

(71) Applicants: Tanya M. Stephens, Miami, FL (US); Marco A. Plyler, Miami, FL (US)

(72) Inventors: Tanya M. Stephens, Miami, FL (US); Marco A. Plyler, Miami, FL (US)

(*) Notice: Subject to any disclaimer, the term of this patent is extended or adjusted under 35 U.S.C. 154(b) by 1009 days.

(21) Appl. No.: 16/186,001

(22) Filed: Nov. 9, 2018

(65) Prior Publication Data

US 2020/0146358 A1 May 14, 2020

(51) Int. Cl.
*H02J 7/00* (2006.01)
*H01M 10/44* (2006.01)
*H01M 50/20* (2021.01)

(52) U.S. Cl.
CPC ......... *H01M 50/20* (2021.01); *H01M 10/441* (2013.01); *H02J 7/0063* (2013.01); *H01M 2220/30* (2013.01); *H02J 2007/0067* (2013.01)

(58) Field of Classification Search
CPC ............... H01M 50/20; H01M 10/441; H01M 2220/30; H02J 7/0063; H02J 2007/0067
See application file for complete search history.

(56) References Cited

U.S. PATENT DOCUMENTS

| | | | |
|---|---|---|---|
| 6,040,560 | A | 3/2000 | Fleischhauer et al. |
| 9,730,472 | B2 | 8/2017 | Farrow |
| 2013/0319440 | A1 | 12/2013 | Capuano |
| 2014/0366899 | A1 | 12/2014 | Plojoux et al. |
| 2015/0164145 | A1* | 6/2015 | Zhou ..................... A61M 15/06 131/329 |
| 2015/0223521 | A1* | 8/2015 | Menting ................. A24F 40/30 131/273 |

(Continued)

FOREIGN PATENT DOCUMENTS

| | | |
|---|---|---|
| KR | 20130001035 | 2/2013 |
| WO | WO2020005695 | 2/2020 |

(Continued)

OTHER PUBLICATIONS

Honeystick Double Vape Cartirdge System (Vapehoneystick), double barrel auto draw oil vaporizer—https://youtube.com/watch?v=kbjX5Sg8eOA, Sep. 7, 2018.

(Continued)

*Primary Examiner* — Samuel Berhanu
(74) *Attorney, Agent, or Firm* — Malloy & Malloy, PL; Peter A. Matos

(57) ABSTRACT

An assembly facilitating the generation of consumable vapor having a housing including a plurality of housing sections each having a different one of a plurality of power sources retained therein. Each of a plurality of connectors are disposed on a different one of said housing sections and include a terminal, each terminal conductively connected to a correspondingly disposed one of the plurality of power sources. A control assembly is operatively connected to each of the plurality of power sources and is structured to variably and independently regulate current from a correspondingly disposed battery to a correspondingly disposed terminal. To complete the generation of vapor, each of the connectors is removably attached in current transferring relation to a heating element of one of the vaporizable material cartridges attached thereto.

18 Claims, 10 Drawing Sheets

(56) References Cited

U.S. PATENT DOCUMENTS

| | | | |
|---|---|---|---|
| 2015/0237914 A1 | 8/2015 | Han | |
| 2016/0150824 A1 | 6/2016 | Memari et al. | |
| 2016/0192708 A1 | 7/2016 | Demeritt et al. | |
| 2016/0235122 A1 | 8/2016 | Krietzman | |
| 2016/0360788 A1* | 12/2016 | Wang | A24F 40/51 |
| 2016/0366940 A1 | 12/2016 | Liu | |
| 2016/0366945 A1 | 12/2016 | Rado | |
| 2017/0027232 A1 | 2/2017 | Scheck et al. | |
| 2017/0354180 A1* | 12/2017 | Fornarelli | A24F 40/485 |
| 2018/0020734 A1 | 1/2018 | Angstead et al. | |
| 2020/0146359 A1 | 5/2020 | Stephens et al. | |

FOREIGN PATENT DOCUMENTS

| | | |
|---|---|---|
| WO | WO2020097435 | 5/2020 |
| WO | WO2020097457 | 5/2020 |

OTHER PUBLICATIONS

4 Vape Pens in One (Heavyhitters Quattro)'(Trippy.Treez), https://www.youtube.com/watch ?v=FBhaaJmjCn0, Dec. 12, 2017.

* cited by examiner

ASSEMBLY FACILITATING THE GENERATION OF VAPOR

BACKGROUND OF THE INVENTION

Field of the Invention

The present invention is directed to an assembly which facilitates the generation of vapor, specifically including consumable vapor, of the type generated by E-cigarettes, personal vaporizers, etc. As such, the one or more embodiments of the present invention include structural and operative versatility which enables their use with different brands, categories, structures etc. of vaporizable material cartridges, of the type associated with different commercially available vaporizers.

Description of the Related Art

Electronic cigarettes or personal vaporizers have become increasingly popular with the consuming public as an alternative to or substitute for the smoking of conventional, tobacco-based cigarettes. As used, "vaping" devices are operative to vaporize an "E-liquid", vaping substance or vaporizable material to produce a consumable vapor, mist, etc. Such a generated vapor is then inhaled by a user of the personal vaporizer and is intended to serve as a satisfying replacement for the experience of smoking a cigarette. As a result, and due to the recognized dangers of cigarette smoking, vaporizing devices of this type have become increasingly popular. Further, E-cigarettes, personal vaporizers and like devices overcome many of the universally recognizable disadvantages of conventional cigarettes including, but not limited to, the absence of tar, odor, ash, pollution, and the inhalation of irritating and carcinogenic byproducts typically resulting from the burning of tobacco in the conventional cigarette. However, there are still numerous disadvantages associated with the use of known or commercially available personal vaporizers, which prevent or restrict their use, in terms of aiding an individual in his/her efforts to quit smoking.

E-cigarettes, personal vaporizers, etc. are typically battery-powered devices which simulate tobacco smoking by producing a consumable vapor, which is generated by the powering of a heating element or atomizer, which in-turn vaporizes the E-liquid solution or vaping substance. In addition, such E-liquids may contain nicotine, in varying degrees, as well as flavoring agents and other ingredients.

It is recognized that to increase the popularity of such vaporizing devices it is necessary to provide the users with a positive experience, which corresponds to or substantially parallels the experience involved in conventional smoking. This means, at least in part, that personal vaporizers must provide the user with a consistent and desirable volume of vapor, which in turn may be related to the consistency and reliability of the battery power sources associated with such devices. In more specific terms, when the power or charge provided by the battery is depleted, voltage in the battery naturally decreases, which in turn derogatorily effects the volume of vapor generated. As a result, known or conventional vaporizers, E-cigarettes, etc. are considered to be unreliable, based at least in part on their inconsistencies and failure to provide the desired or intended "smoking experience".

In order to overcome disadvantages and problems of the type set forth above, there have been numerous attempts to increase and or selectively regulate the volume of vapor generated in order to more closely correspond to the conventional tobacco smoking process. Such known or prior art attempts have been directed to the inclusion of variable power sources which may be selectively and/or automatically regulated dependent on the usage of the personal vaporizer. In addition, attempts have been made to increase the generated volume of vapor of such E-cigarettes, personal vaporizers, etc. by increasing the quantity vaporizable material and or the delivery characteristics thereof. Such attempts may also involve the modified structuring of the cartridges which contain the vaporizable material as well as a heating element operative to heat and vaporize the aforementioned E-solution.

In spite of the above attempts and known structural and operative features of conventional and commercially available personal vaporizers, there still remains distinct and recognizable disadvantages which hinder the use thereof.

Accordingly, there is a need in this area for a proposed and preferred assembly which facilitates the generation of consumable vapor by concurrently energizing a selective or predetermined plurality of vaporizable material cartridges in order to increase the quantity of the generated vapor. In addition, operative features associated with such a preferred and proposed assembly enables selective variance of the content, flavor and quantity of the vapor generated by each of a plurality of vaporizable material cartridges. In addition, the preferred embodiments of such an assembly are structured to have an enhanced versatility allowing it to be used in combination with a number of different brands, types, categories, etc. of vaporizable material cartridges.

SUMMARY OF THE INVENTION

The present invention is directed to an assembly which facilitates the generation of consumable vapor, when used in combination with a plurality of vaporizable material cartridges. As used herein, the term "vaporizable material cartridge" is meant to describe any one of a plurality of different type cartridges used with E-cigarettes, personal vaporizers, etc.

In more specific terms, conventional and/or commercially available vaporizable material cartridges typically include a mouthpiece disposed in fluid communication with a supply of vaporizable material. Further such conventional or commercially available cartridges include at least one heating element or operational equivalent structure that generate sufficient heat, when electrically activated, to vaporize the material within the cartridge. Accordingly, vapor is generated, passed through the mouthpiece of the cartridge and is consumed by a user of the E-cigarette, vaporizer, etc. As indicated hereinafter, each of the preferred embodiments of the assembly of the present invention is structured to be used with different ones of a plurality of vaporizable material cartridges regardless of the brand, capacity, type, category, etc.

Therefore, one preferred embodiment of the present invention is directed to an assembly facilitating the generation of consumable vapor, when used in combination with any one or preferably a plurality of vaporizable material cartridges. As such, the assembly of this embodiment includes a housing including a power source and a plurality of connectors. Each of the plurality of connectors is structured to direct or transfer electrical current to each of the vaporizable material cartridges connected to different ones of the plurality of connectors.

In addition, each of the plurality of connectors comprises a conductive terminal disposable in current transferring relation to a heating element within a correspondingly disposed one of the plurality of vaporizable material cartridges to which a corresponding connector is attached. Moreover, in this preferred embodiment, the power source comprises a plurality of batteries each electrically connected to a different one of the plurality of connectors and to a corresponding one of the terminals associated with each of the plurality of connectors.

The housing of this embodiment comprises a plurality of housing sections each of which is dimensioned and configured to contain a different one of the plurality of batteries which define the power source. In cooperation therewith, each of the plurality of connectors is disposed in segregated relation to one another while being concurrently attached to a different one of the plurality of housing sections. Also, in at least one structural modification, each of the plurality of housing sections comprises a tubular or sleeve-like configuration having a hollow interior. The hollow interior of each of the plurality of tubular or sleeve-like housing sections is dimensioned to retain a different one of the plurality of batteries therein in segregated relation to one another. Moreover, each the batteries may be rechargeable batteries.

One feature of this embodiment comprises the plurality of housing sections being fixedly connected one another to collectively define a "unitary construction" of the housing. The unitary construction of the housing may be further defined by the fixedly attached housing sections and the corresponding plurality of connectors thereby facilitating the handling and utilization. In addition, the unitary construction of the housing may be concurrently attached to a plurality of vaporizable material cartridges, thereby providing an increase in the volume of vapor output.

Another feature of this embodiment of the present invention includes the aforementioned control assembly being operatively connected to the power source. Further, the control assembly comprises a plurality of switches each operatively mounted on a different one of the housing sections in current regulating relation between correspondingly disposed ones of said plurality of batteries and the connector/terminals. Moreover, each of the plurality of switches is structured to variably regulate current flow from the plurality of batteries to correspondingly disposed ones of the plurality of terminals. Further, each of the plurality of switches of the control assembly is structured for independent activation and control of each of the terminals.

Therefore, due at least in part to the enhanced versatility of the control assembly, comprising a plurality of switches, each of the terminals may be independently activated, which in turn activates a corresponding one of the vaporizable material cartridges attached to the connector associated with a given terminal. As should also be apparent, the plurality of switches may be concurrently activated and independently regulated such that all of the plurality of vaporizable material cartridges attached to the individual connectors/terminals concurrently produce vapor. Such concurrent activation serves to greatly increase the volume of generated vapor accessible by a user.

As is well known, the composition of the available vaporizable material in different cartridges may include different flavoring agents, quantities of nicotine and other ingredients. Therefore, the plurality of switches of the control assembly may independently and/or concurrently activate the plurality of connected vaporizable material cartridges, in order to selectively vary the content of the vapor being consumed. In addition, the current directed to each of the cartridges may be variably regulated to control the amount of vapor generated by each of the cartridges.

Accordingly, while the volume of generated vapor may be greatly increased to the satisfaction of a user, such a user can also selectively regulate the different flavors, agents, etc. contained within the generated vapor by selectively varying the amount of current transferred to each cartridge, via a corresponding terminal/connector to which a given cartridge is attached.

To further facilitate the delivery of vapor generated concurrently by a plurality of vaporizable material cartridges, the assembly of the present invention is also usable with and may include a vapor access adapter. The access adapter may be structurally adapted for use with different preferred embodiments of the present invention and includes an access opening or "mouthpiece". Further, the access adapter may be removably connected to the housing in at least partially enclosing relation to all of the vaporizable material cartridges and in direct fluid communication with the quantity of vapor generated thereby. In accomplishing this, the access adapter may include a path of fluid flow disposed and structured to direct vapor concurrently generated by all of the vaporizable material cartridges. Such collective vapor is then directed along the aforementioned path of fluid flow to the access opening or mouthpiece of the access adapter.

Yet another preferred embodiment of the present invention is directed to an assembly which also facilitates the generation of vapor when used in combination with preferably a plurality of vaporizable material cartridges. As such, this preferred embodiment has similar operational advantages, which may be attractive to the user or consumer, at least to the extent of enhancing the volume of generated vapor and the ability to concurrently consume vapor generated by a plurality of vaporizable material cartridges.

More specifically, this additional preferred embodiment includes a "current adapter" electrically connected to a power source. The power source may be a part of the assembly as provided to the consuming public. In the alternative, the current adapter may be utilized with different power sources and be made available to the consuming public independently of the power source.

Therefore, the current adapter includes a plurality of connectors each of which is structured for operative attachment to a different one of a plurality of vaporizable material cartridges. In addition, a current adapter includes a current distributor comprising a plurality of conductors. Each of the plurality of conductors is electrically interconnected between the power source and a different one of the plurality of connectors. The current adapter also includes a conductive attachment structured to be removably connected to the power source. As such, the plurality of conductors are disposed and structured to independently direct current flow from the conductive attachment, connected to the power source, and each of the plurality of connectors.

As with the preferred embodiment described above, this additional preferred embodiment includes each of the connectors having a terminal, wherein each terminal is electrically connected in current transferring relation to a heating element within an attached one of the plurality of vaporizable material cartridges. The plurality of terminals and corresponding ones of the plurality of connectors are cooperatively structured to assure electrical interconnection between each terminal and a heating element associated with the vaporizable material cartridge attached to a corresponding one of the connectors, as also set forth above.

In even more specific terms, the current adapter comprises a base, wherein the plurality of connectors are fixedly mounted on an exposed, outer face or end of the base so as to extend outwardly there from in laterally spaced relation to one another. The lateral spacing of the plurality of connectors are such as to facilitate the concurrent attachment of a plurality of the vaporizable material cartridges thereto, thereby enabling their concurrent use. In cooperation therewith, the aforementioned conductive attachment is fixedly mounted on and extends outwardly from an inner and/or opposite face of the base, relative to the plurality of connectors. As such the conductive attachment is structured to be removably connected and thereby establish an electrical interconnection between the power source and the plurality of connectors.

Further, one additional feature of this embodiment of the assembly includes the power source being a single battery a of sufficient capacity to concurrently and/or individually power each of the plurality of vaporizable material cartridges connected to different ones of the plurality of connectors. Adaptive switching may be operatively associated with the battery, such as being mounted on a casing or housing disposed in retaining relation to a single battery power source. The output terminal of the battery is directly but removably electrically interconnected to the conductive attachment associated with the base of the current adapter. Therefore, the removable attachment of the current adapter, via the conductive attachment, establishes an operative electrical interconnection between the battery, the conductors of the current distributor and the terminals associated with each of the plurality of connectors. In turn, the heating elements of each of the plurality of vaporizable material cartridges, connected to different ones of the plurality of connectors/terminals, are capable of being individually and collectively activated. The resultant activation, through appropriate switching, will serve to selectively activate the plurality of vaporizable material cartridges attached to the plurality of connectors, resulting in a concurrent generation of vapor from the plurality of cartridges.

As with the other of the above described preferred embodiment, this embodiment may also be utilized with an access adapter, of the type described above. More specifically, the access adapter may be removably connected to the base of the current adapter in at least partially enclosing relation to all of the vaporizable material cartridges and in direct fluid communication with the quantity of vapor generated thereby. In accomplishing this, the access adapter may include a path of fluid flow disposed and structured to direct vapor concurrently generated by all of the vaporizable material cartridges to a mouthpiece of the access adapter.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As represented in the accompanying Figures, the present invention is directed to an assembly, having a plurality of embodiments, which facilitate the generation of consumable vapor, when used in combination with a plurality of vaporizable material cartridges.

Figure 1:
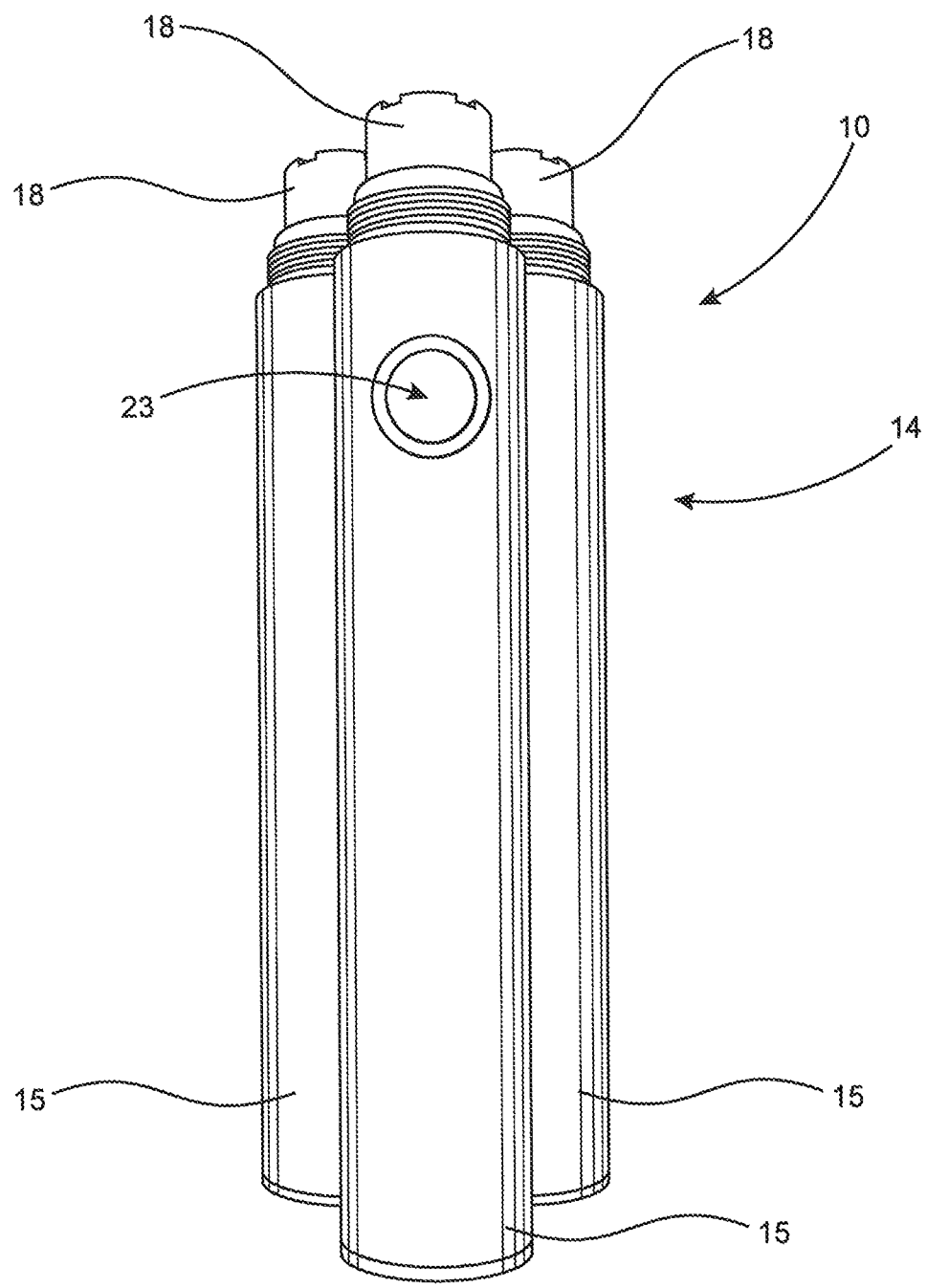
FIG. 1 is a perspective view of one embodiment of a vapor generating assembly of the present invention.
Figure 2:
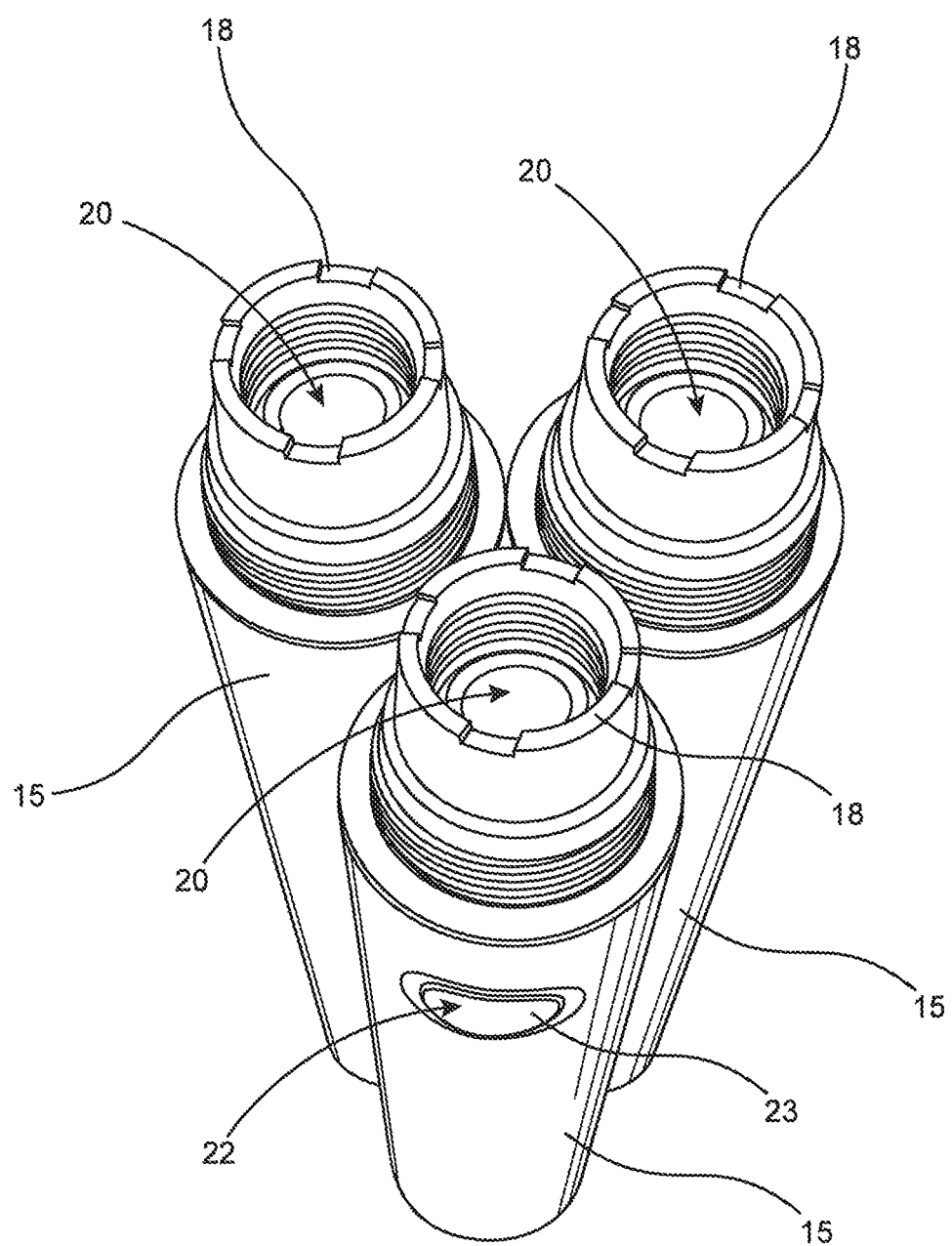
FIG. 2 is a top perspective view of the embodiment of FIG. 1.
Figure 3:
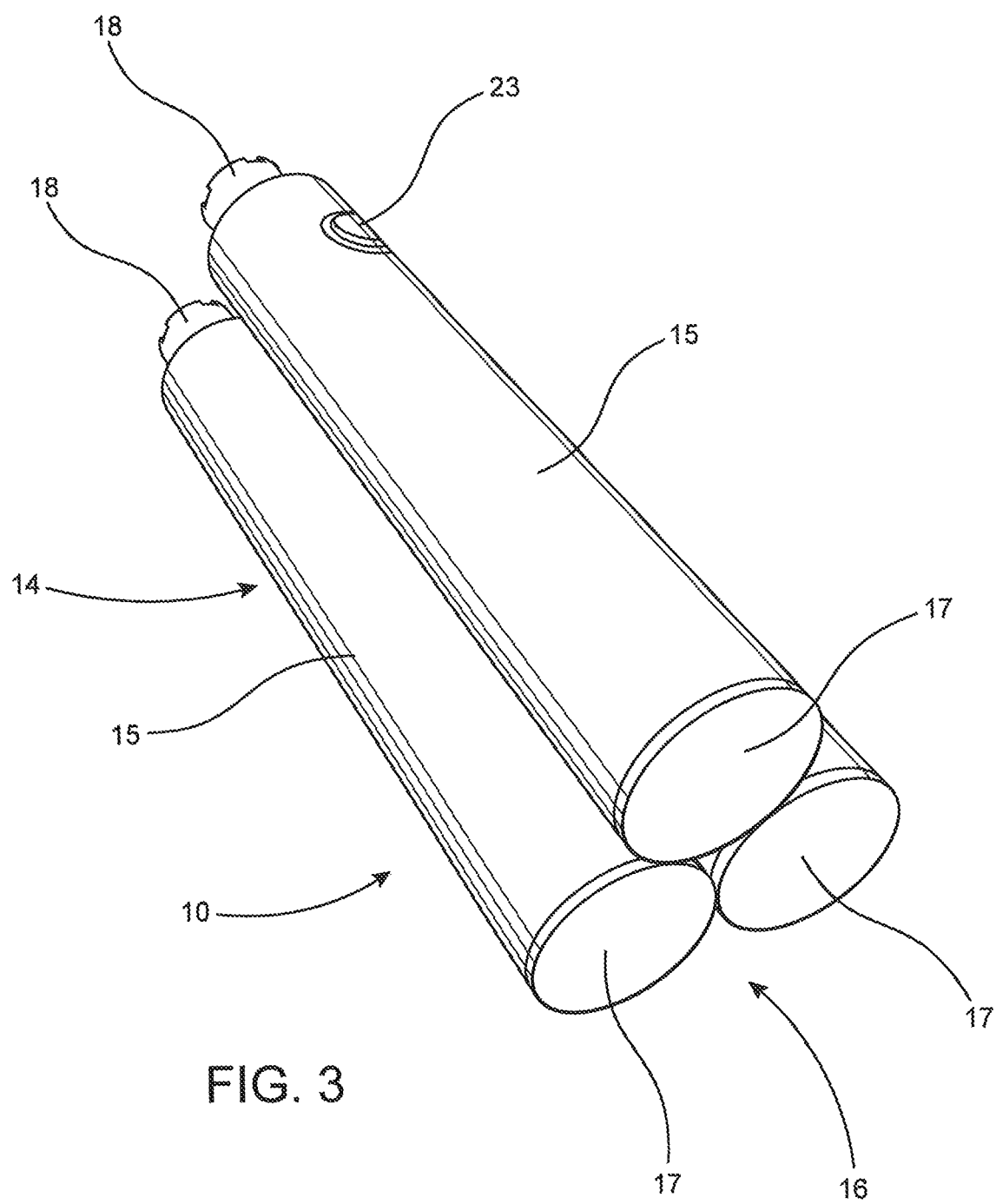
FIG. 3 is a bottom perspective view of the embodiment of FIGS. 1-2.
Figure 4:
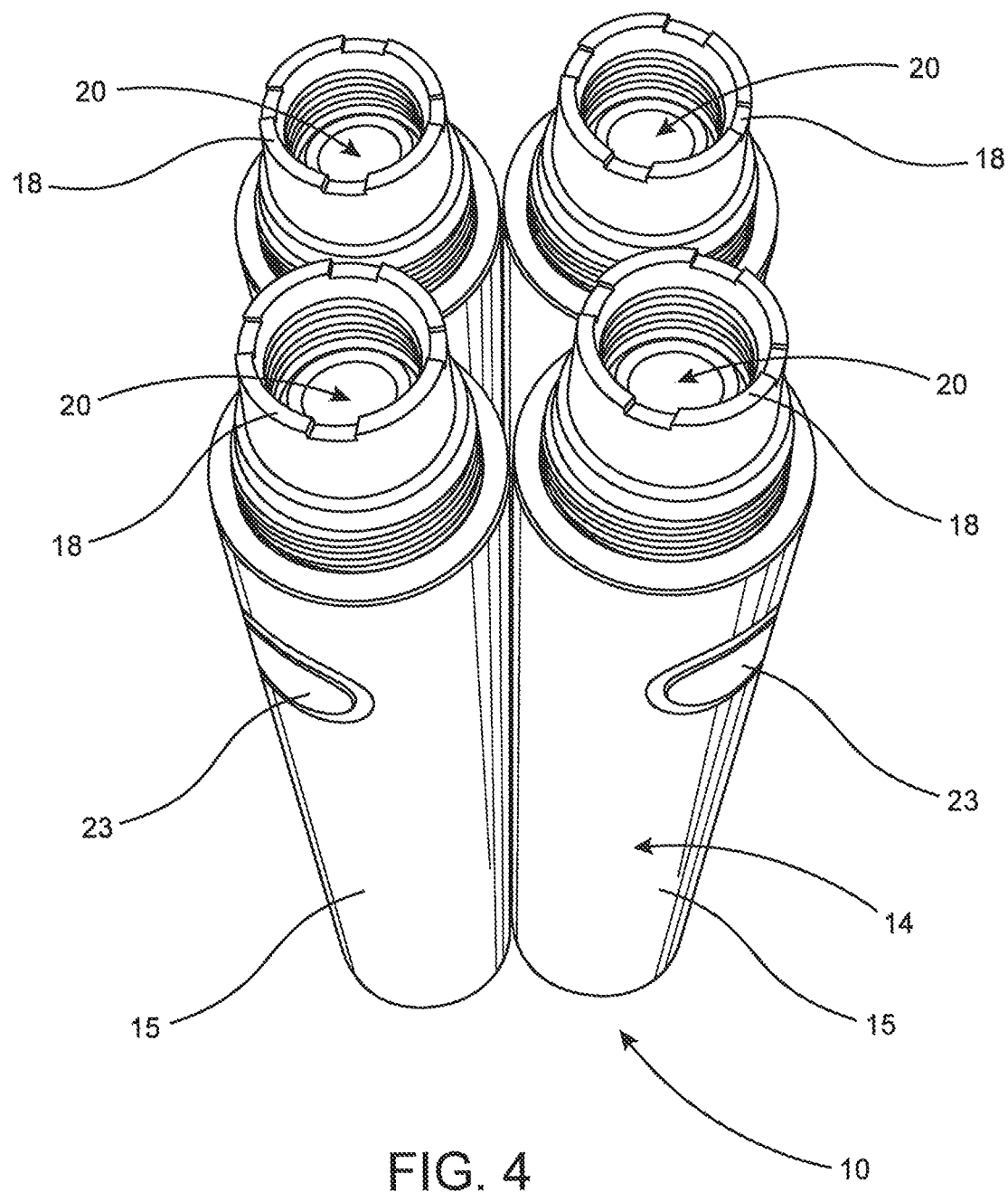
FIG. 4 is a top perspective view of yet another embodiment of the assembly of the present invention.
Figure 5:
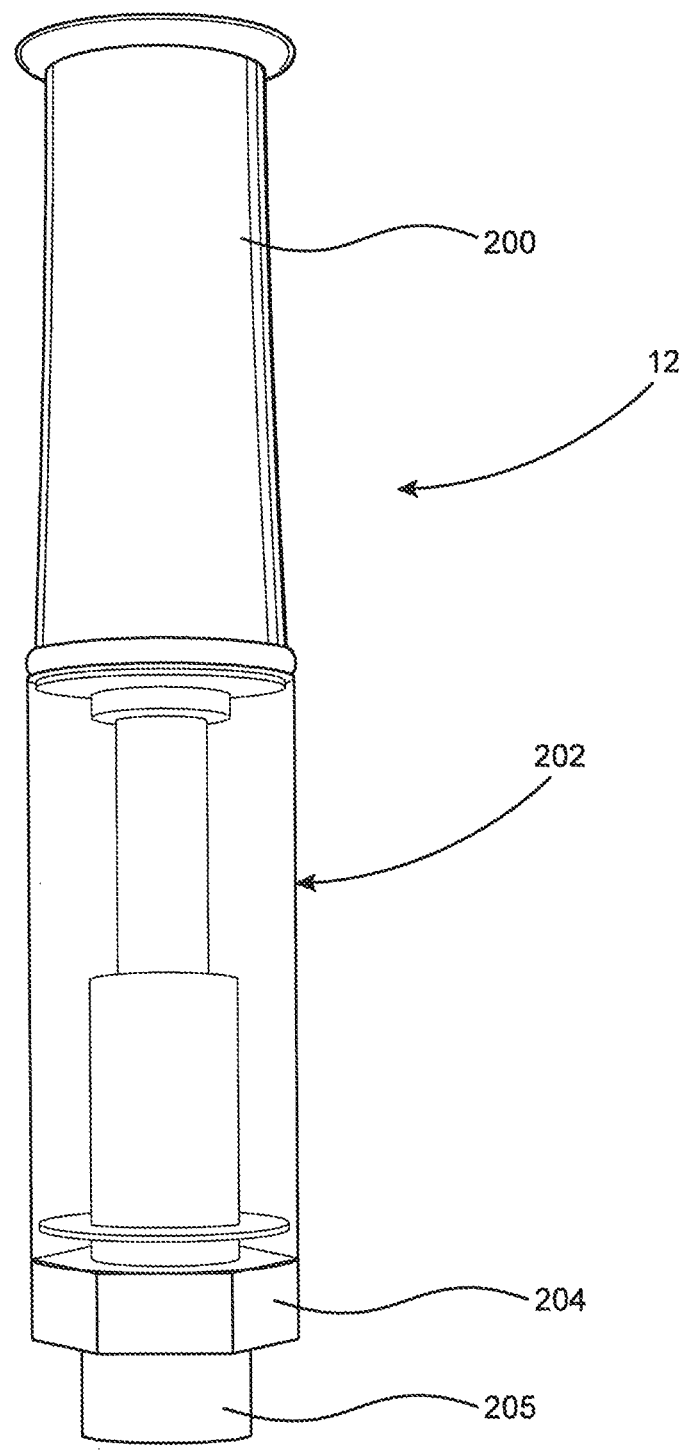
FIG. 5 is a perspective view of one of a possible plurality of vaporizable material cartridges usable with the various embodiments of the vapor generating assembly of the present invention.

With primary reference to FIGS. 1-6, one preferred embodiment of the present invention is directed to an assembly generally indicated as 10 facilitating the generation of consumable vapor, when used in combination with any one or preferably a plurality of vaporizable material cartridges of the type, but not limited to that represented in FIG. 5 and generally indicated as 12. As such, the assembly 10 of this embodiment includes a housing generally indicated as 14, including a power source 16 and a plurality of connectors 18. Each of the plurality of connectors 18 includes a terminal 20 structured to direct or transfer electrical current to each of a plurality of vaporizable material cartridges 12 connected to a corresponding one of the plurality of connectors 18.

By way of example only and with reference to FIG. 5 the vaporizable material cartridge 12 is representative of a number of known or conventional cartridges and may include a mouthpiece 200 and an interior chamber 202. The chamber 202 is for the containment of a vaporizable material which, as set forth herein, may vary in the content or ingredients such as differences in flavoring, nicotine content and other agents or ingredients. Also, as conventionally structured the vaporizable material cartridges 12 includes a heating element 204 and the connector 205. As utilized the connector 205 of the cartridge 12 is connected to one of the connectors 18 such that the terminal 20 of the corresponding connector 20 is disposed in electrical interconnection and activating relation to the heating element 204 of the cartridge 12. It is again emphasized that the structural features of the exemplary cartridge 12 is representative only of a number of such vaporizable material cartridges with which the assembly 10 and assembly 100 may be utilized.

Moreover, each of the plurality of connectors 18 may be "universally" structured to facilitate attachment to different types, brands, categories, etc. of vaporizable material cartridges 12. Further, each of the plurality of connectors 18 may include a female-type, threaded attachment and may also have magnetic capabilities. Such magnetic capabilities further facilitate the connection to different types of vaporizable material cartridges 12.

The plurality of connectors 18 and corresponding ones of the conductive terminals 20 is disposable in current transferring relation to a heating element 205 of the type typically included within a correspondingly disposed one of the plurality of conventional vaporizable material cartridges 12, to which a corresponding connector 18 is attached. Moreover, in preferred embodiment represented by assembly 10, the power source 16 comprises a plurality of batteries 17 each electrically connected to a different one of the plurality of connectors 18 and to a corresponding one of the terminals 20 associated with each of the plurality of connectors 18.

The housing 14 of assembly 10 comprises a plurality of housing sections 15 each of which is dimensioned and configured to contain a different one of the plurality of batteries 17 which define the power source 16. In cooperation therewith, each of the plurality of connectors 18 is disposed in segregated relation to one another while being concurrently attached to a different one of the plurality of housing sections 15. Also, in at least one structural modification, each of the plurality of housing sections 15 comprises a tubular or sleeve-like configuration having a hollow interior. The hollow interior of each of the plurality of tubular or sleeve-like housing sections 15 is dimensioned to retain a different one of the plurality of batteries 17 therein in segregated relation to one another. Moreover, each the batteries 17 may be a rechargeable battery.

One feature of this embodiment of the assembly 10 comprises the plurality of housing sections 15 being fixedly connected one another to collectively define a "unitary construction" of the housing 14. The unitary construction of the housing 14 may be further defined by the fixedly attached housing sections 15 and the corresponding plurality of connectors 18 thereby facilitating the handling and utilization of the assembly 10. As represented, the unitary construction of the housing 14 may be concurrently attached to a plurality of the vaporizable material cartridges 12, thereby providing an increase in the volume of vapor output, when in use.

Another feature of this embodiment of the assembly 10 includes the aforementioned control assembly 22 being operatively connected to the power source 16. Further, the control assembly 22 comprises a plurality of switches 23 each operatively mounted on a different one of the housing sections 15 in current regulating relation between correspondingly disposed ones of said plurality of batteries 17 and the connector 18 and corresponding ones of the terminals 20. Moreover, each of the plurality of switches 23 is structured to variably regulate current flow from the plurality of batteries 17 to correspondingly disposed ones of the plurality of terminals 20. Further, each of the plurality of switches 23 of the control assembly 22 is structured for independent activation and control of each of the terminals 20.

Therefore, due at least in part to the enhanced versatility of the control assembly 22, comprising a plurality of switches 23, each of the terminals may be independently activated, which in turn activates a corresponding one of the vaporizable material cartridges 12 attached to the connector 18 associated with a given terminal 20. As should also be apparent, the plurality of switches 23 may be concurrently activated and independently regulated such that all of the plurality of vaporizable material cartridges 12 attached to the individual connectors 18 and corresponding terminals 20 concurrently produce vapor. Such concurrent activation serves to greatly increase the volume of generated vapor accessible by a user.

As is well known, the composition of the available vaporizable material in different cartridges may include different flavoring agents, quantities of nicotine and other ingredients. Therefore, the plurality of variable switches 23 of the control assembly 22 may independently and/or concurrently activate the plurality of connected vaporizable material cartridges 12, in a manner which may selectively vary the content of the vapor being consumed. In addition, the current directed to each of the cartridges 12 may be variably regulated to control the amount of vapor generated by each of the cartridges. Therefore, while the volume of generated vapor may be greatly increased to the satisfaction of a user, such a user can also selectively regulate the different flavors, agents, etc. contained within the generated vapor by selectively varying the amount of current transferred to each cartridge 12, via a corresponding connector 18 and associated terminal 20 to which a given cartridge 12 is attached.

As emphasized, the assembly 10 is structured to concurrently operate and activate a plurality of vaporizable material cartridges 12 of the type, but not limited to, that shown in FIG. 5. Therefore, the structural modification of the assembly 10 as represented in FIG. 4, as compared to the housing 14 in FIGS. 1-3, clearly indicates that the number of housing sections 15, connectors 18 and terminals 20 may vary, such as including three or four in number. In turn, the number of vaporizable material cartridges 12 that may be concurrently used may also vary. In more specific terms, the housing 14 may include a plurality of housing sections 15 which is preferably, but not necessarily, at least three in number and may be four in number. As such, corresponding number of connectors 18, terminals 20, batteries 17 may be three or four in number to define the aforementioned "unitary construction" of the housing 14. However, it is emphasized that the assembly 10 is not limited to a precise three or four housing sections 15 as represented in FIGS. 1-4, but may vary in number.

Figure 6:
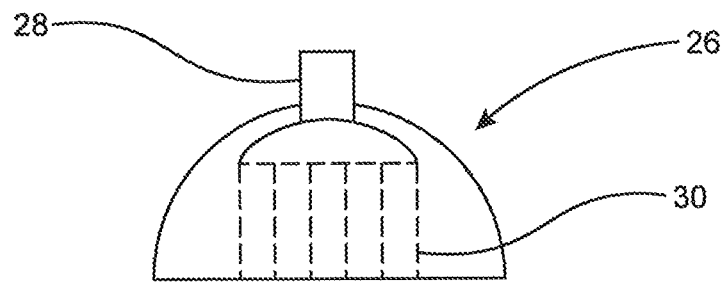
FIG. 6 is a schematic representation of an access adapter of the present invention.
Figure 7:
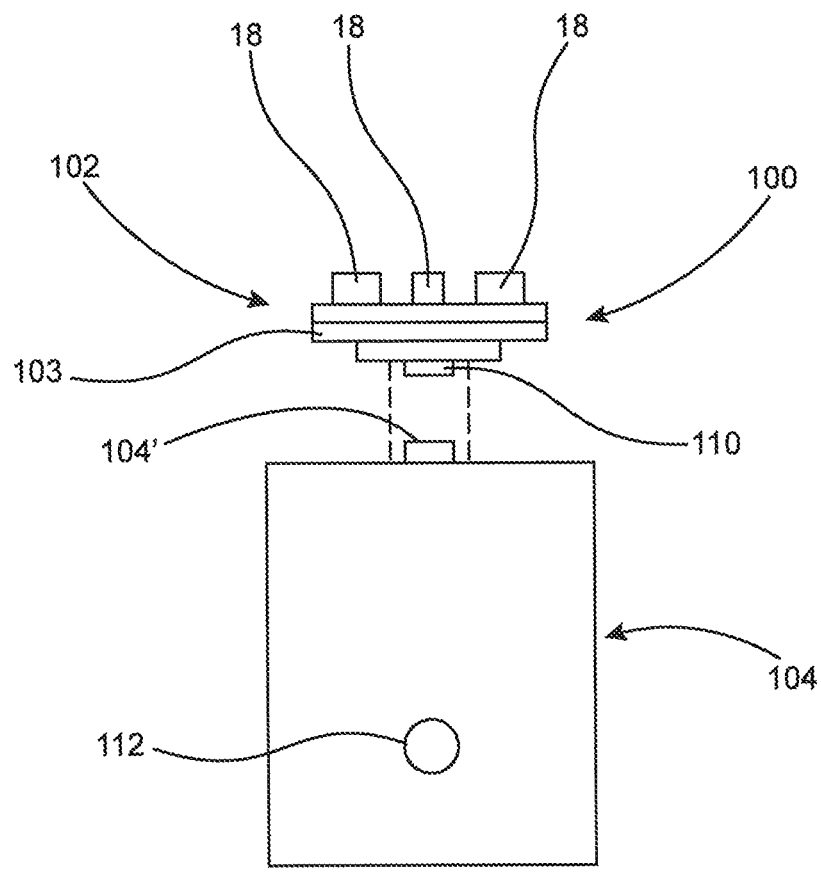
FIG. 7 is a schematic representation of yet another preferred embodiment of the vapor generating assembly of the present invention.
Figure 8:
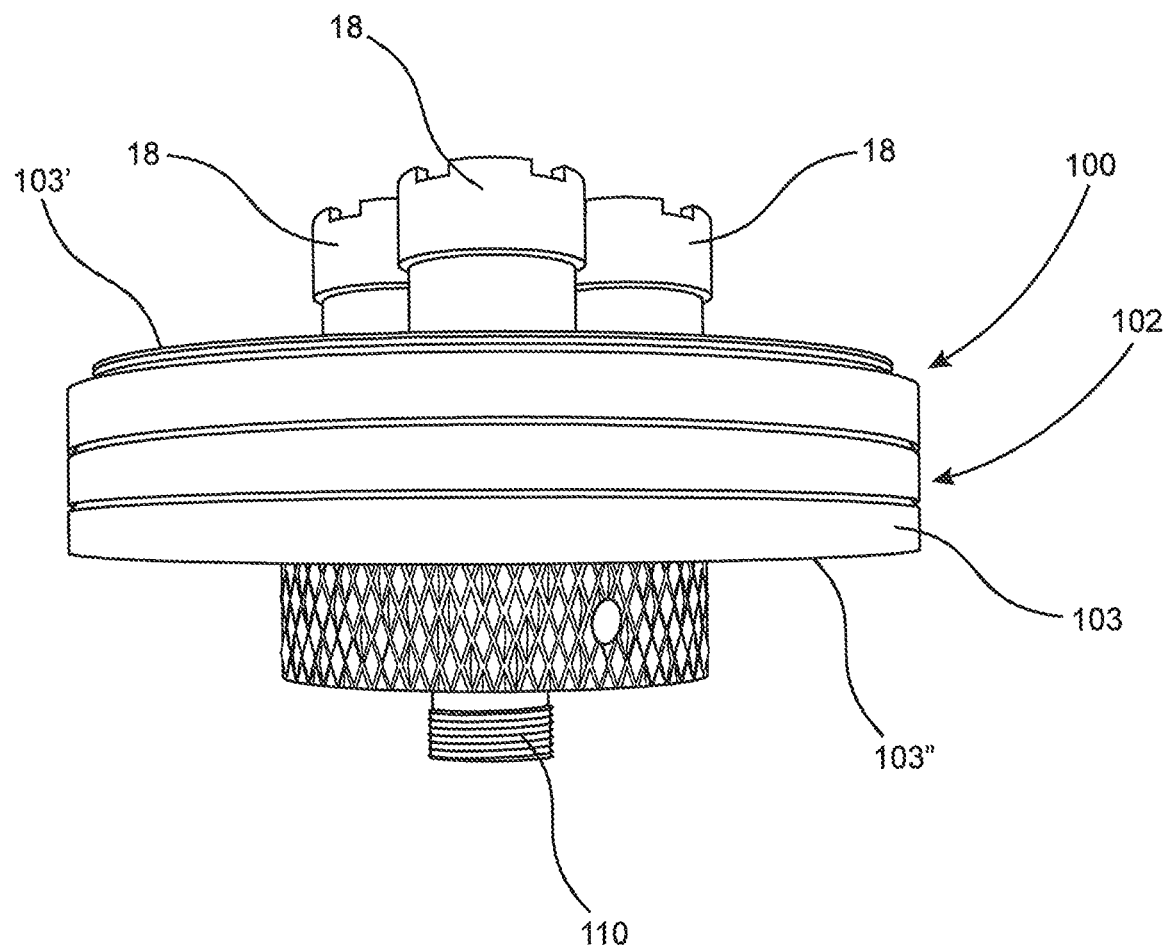
FIG. 8 is a perspective view of a current adapter of the embodiment of FIG. 7.

To further facilitate the delivery of vapor generated concurrently by a plurality of vaporizable material cartridges, the assembly 10 of the present invention is also usable with a vapor access adapter, generally and schematically indicated as 26 in FIG. 6. The access adapter 26 may be structurally adapted for use with different preferred embodiments of the present invention including the assembly 10 in FIGS. 1-4 and the assembly 100 as represented in FIGS. 7-12. The access adapter 26 includes an access opening or "mouthpiece" 28. Further, the access adapter may be removably connected to the housing 14 in at least partially enclosing relation to all of the vaporizable material cartridges 12 attached to the plurality of connectors 18 and in direct fluid communication with the quantity of vapor generated thereby. In accomplishing this, the access adapter 26 may include a path of fluid flow generally indicated as 30. The path of fluid flow 30 is disposed and structured to direct vapor concurrently generated by all of the vaporizable material cartridges 12 to the access opening or mouthpiece 28 of the access adapter 26.

Yet another preferred embodiment of the present invention is directed to an assembly 100 which also facilitates the generation of vapor when used in combination with preferably a plurality of vaporizable material cartridges 12, of the type set forth above and represented in FIG. 5. As such, the assembly 100 has similar operational advantages, which may be attractive to the user or consumer, at least to the extent of enhancing the volume of generated vapor and the ability to concurrently consume vapor generated by a plurality of vaporizable material cartridges 12.

More specifically, this additional preferred embodiment of the assembly 100 includes a "current adapter" 102 electrically connected to a power source 104. The power source 104 may be a part of the assembly 100 as provided to the consuming public. In the alternative, the current adapter 102 may be utilized with different power sources and be made available to the consuming public independently of the power source 104.

Figure 9:
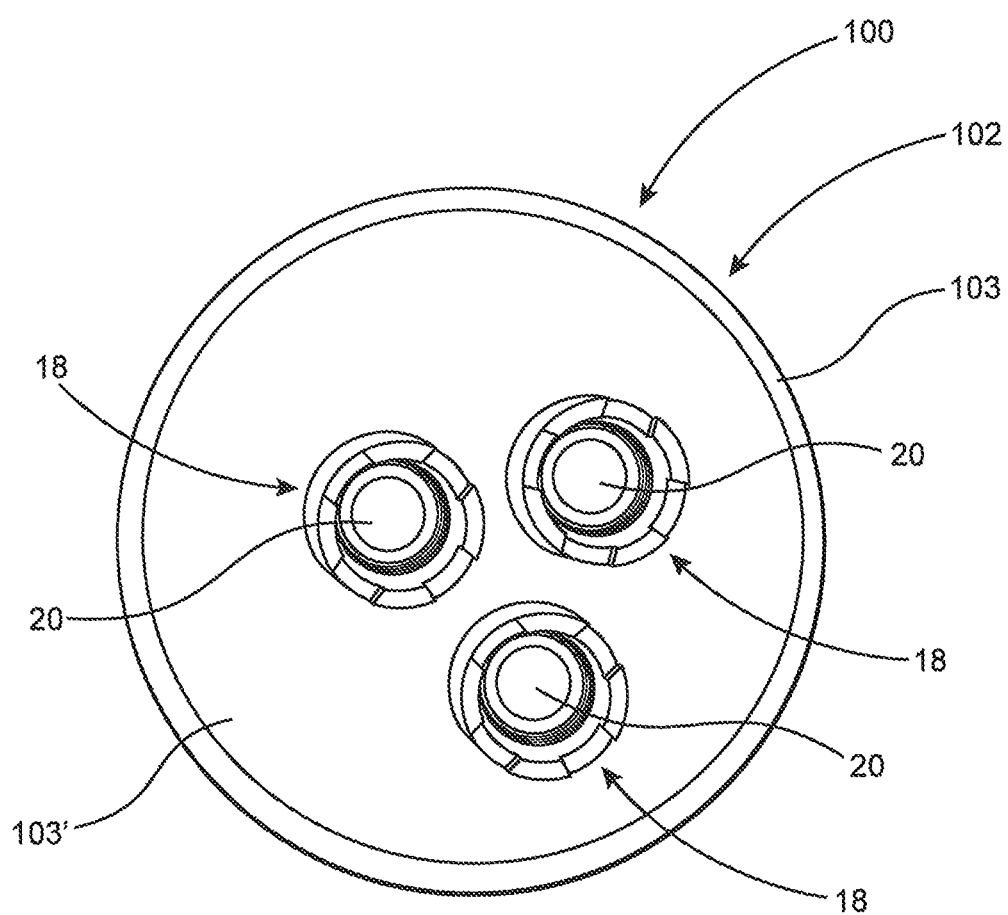
FIG. 9 is a top perspective view of the embodiment of FIG. 8.
Figure 10:
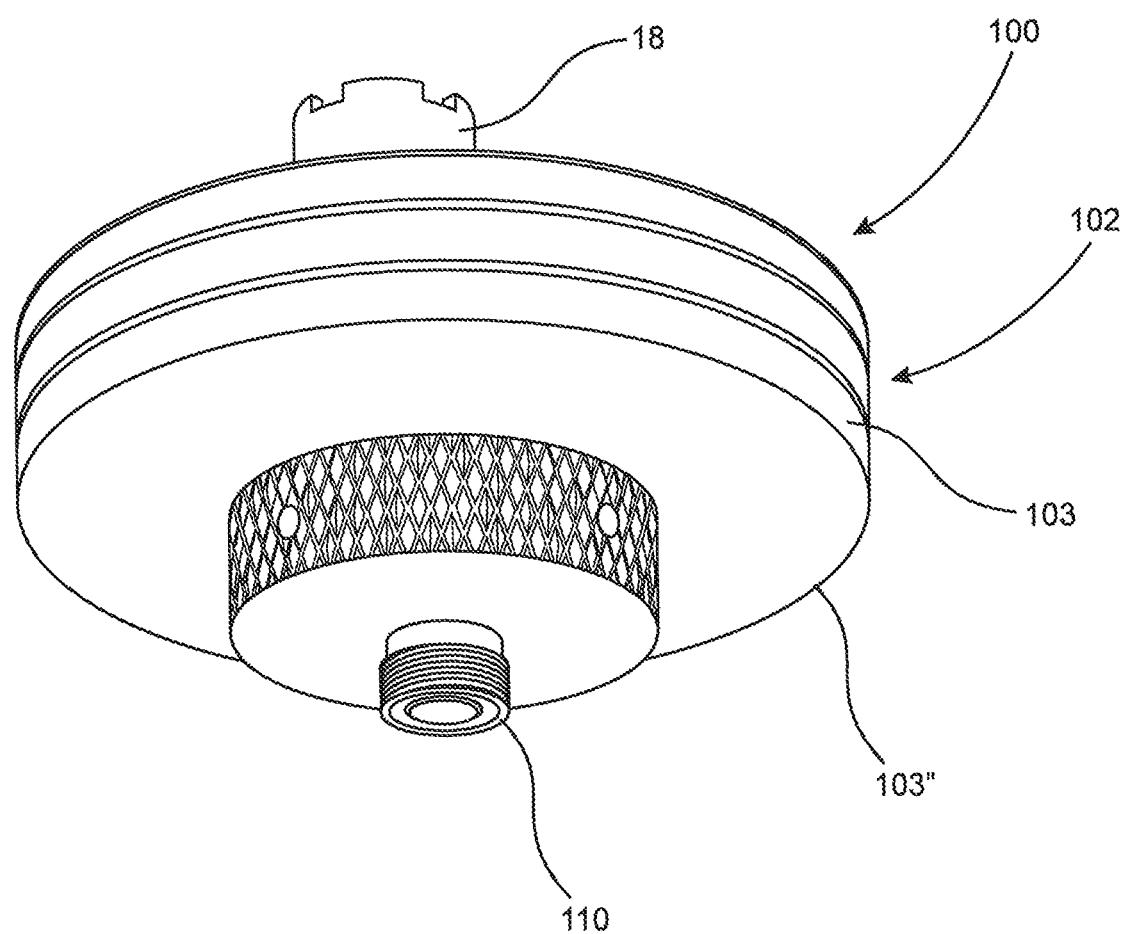
FIG. 10 is a bottom perspective view of the embodiment of FIGS. 8-9.
Figure 11:
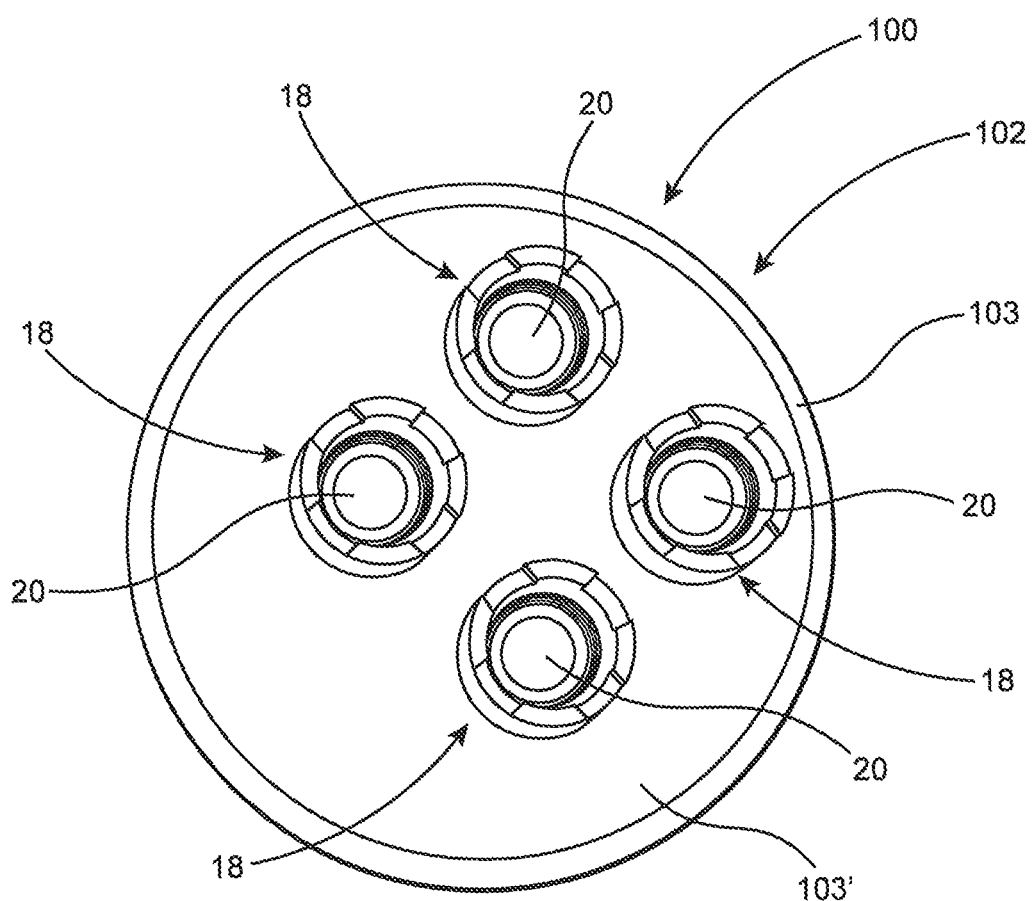
FIG. 11 is a top perspective view of yet another embodiment of a current adapter of the present invention.

Therefore, the current adapter includes a plurality of connectors 18 each of which is structured for operative attachment to a different one of a plurality of vaporizable material cartridges 12, as set forth above with regard to the assembly 10. A comparison of FIGS. 9 and 11 indicates that the number of connectors 18 may vary, such as three connectors 18, as represented in FIG. 9 and four connectors 18, as represented in FIG. 11. However, the plurality of connectors 18 and corresponding terminals 20 are not limited to either three or four on number.

Figure 12:
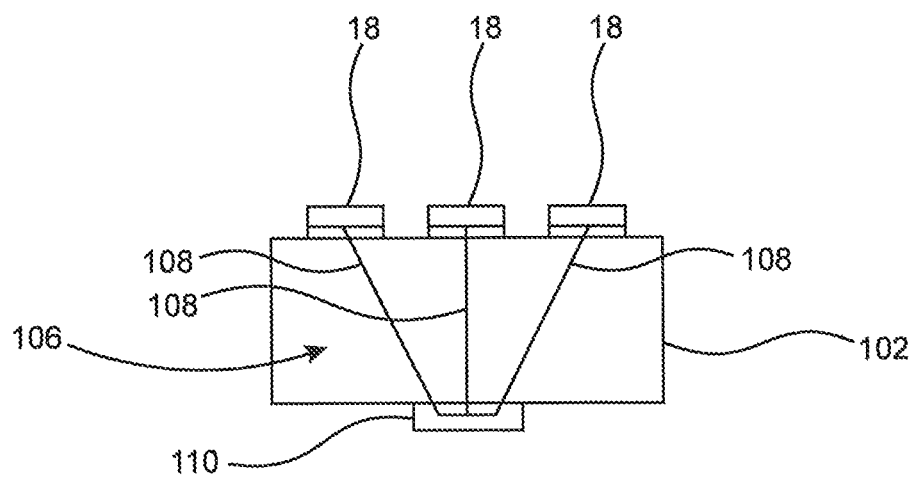
FIG. 12 is a schematic representation of a current distributor operatively associated with the different embodiments of the current adapter, as represented in FIGS. 8-11.

In addition, the current adapter 102 includes a current distributor 106, schematically represented in FIG. 12, comprising a plurality of conductors 108. Each of the plurality of conductors 108 is electrically interconnected between the power source 104 and a different one of the plurality of connectors 18. In order to facilitate such electrical connection, the current adapter 102 also includes a conductive attachment 110 structured to be removably connected to a corresponding output terminal 104' on the power source 104. As such, the plurality of conductors 108 are disposed and structured to independently direct current flow from the conductive attachment 110, when it is connected to the power source 104 via output terminal 104', and each of the plurality of connectors 18, corresponding terminals 20 and attached ones of the vaporizable material cartridges 12.

As with the assembly 10 described above, the assembly 100 includes each of the connectors 18 having a conductive terminal 20. Moreover, each terminal 20 is electrically connected in current transferring relation to a heating element 205 within an attached one of the plurality of vaporizable material cartridges 12. The plurality of terminals 20 and corresponding ones of the plurality of connectors 18 are cooperatively structured to assure electrical interconnection between each terminal 20 and the heating element associated with the vaporizable material cartridge 12 attached to a corresponding one of the connectors 18, as also set forth above.

In even more specific terms, the current adapter 102 comprises a base 103, wherein the plurality of connectors 18 are fixedly mounted on an exposed, outer face or end 103' of the base 103 so as to extend outwardly there from in laterally spaced relation to one another, as represented in at least FIG. 9. The lateral spacing of the plurality of connectors 18 is such as to facilitate the concurrent attachment of a plurality of the vaporizable material cartridges 12 thereto, thereby enabling their concurrent use. In cooperation therewith, the aforementioned conductive attachment 110 is fixedly mounted on and extends outwardly from an inner and/or opposite face 103" of the base 103, relative to the outer face or end 103' and plurality of connectors 18. As such the conductive attachment 110 is structured to be removably connected output terminal 104' and thereby establish an electrical interconnection between the power source 104 and the plurality of connectors 18 and corresponding terminals 20.

Further, one additional feature of this embodiment of the assembly 100 includes the power source 104 comprising a single battery of sufficient capacity to concurrently and/or individually power each of the plurality of vaporizable material cartridges 12 connected to different ones of the plurality of connectors 18 and terminals 20. Adaptive switching, as at 112, may be operatively associated with the battery and power source 104, such as being mounted on a casing or housing disposed in retaining relation to a single battery power source 104. The output terminal 104' of the battery/power source 104 is directly but removably electrically interconnected to the conductive attachment 110 associated with the base 103 of the current adapter 102 of the assembly 100.

Therefore, the removable attachment of the current adapter 102, via the conductive attachment 110, establishes an operative electrical interconnection between the battery/power source 104, the conductors 108 of the current distributor 106 and the terminals 20 associated with each of the plurality of connectors 18. In turn, the heating elements of each of the plurality of vaporizable material cartridges 12, connected to different ones of the plurality of connectors 18 and corresponding terminals 20, are capable of being individually and collectively activated. The resultant activation, through appropriate adaptive and a variable switching 112, will serve to selectively activate the plurality of vaporizable material cartridges 12 attached to the plurality of connectors 18 and corresponding terminals 20, resulting in a concurrent generation of vapor from the plurality of cartridges 12.

While not specifically represented, the adaptive switching 112 may be structured to selectively and independently vary current flow from the battery/power source 104 to each of the connectors 18 and corresponding terminals 20, via conductors 108. Such adaptive and variable switching 112 may include different variably adjustable circuitry of conventional or customized design.

As with the above described embodiment of the assembly 10, the assembly 100 may also be utilized with an access adapter 26, of the type described above, with primary reference to FIG. 6. More specifically, the access adapter 26 may be removably connected to the base 103 of the current adapter 102 in at least partially enclosing relation to all of the vaporizable material cartridges 12 attached to connectors 18 and in direct fluid communication with the quantity of vapor generated thereby. In accomplishing this, the access adapter 26 may include the path of fluid flow 30 disposed and structured to direct all of the vapor concurrently generated by all of the vaporizable material cartridges 12 to a mouthpiece 28 of the access adapter 26.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An assembly facilitating generation of consumable vapor comprising:
   a housing including a power source and a plurality of connectors,
   each of said plurality of connectors structured for current transfer to a different one of a plurality of vaporizable material cartridges,
   a control assembly operatively connected to said power source; and said power source and said control assembly cooperatively structured to independently regulate said current transfer to each of the vaporizable material cartridges;

said power source comprising a plurality of batteries each electrically connected to a different one of his said plurality of connectors; and said housing comprising a plurality of housing sections, each of said plurality of housing sections dimensioned and configured to contain a different one of said plurality of batteries; and said control assembly comprising a plurality of switches each operatively mounted on a different one of said housing sections in current regulating relation to a correspondingly disposed one of said plurality of batteries.

2. The assembly as recited in claim 1 wherein each of said connectors comprises a terminal, each of said terminals disposable in current transferring relation to a heating element within a correspondingly disposed one of the plurality of vaporizable material cartridges.

3. The assembly as recited in claim 1 wherein each of said plurality of connectors is disposed in segregated relation to one another and attached to a different one of said plurality of housing sections.

4. The assembly as recited in claim 3 wherein each of said plurality of housing sections comprises a tubular configuration having a hollow interior portion dimensioned to retain a different one of said plurality of batteries therein, in segregated relation to one another.

5. The assembly as recited in claim 4 wherein said plurality of housing sections are fixedly connected to one another to collectively define a unitary construction of said housing.

6. The assembly as recited in claim 3 wherein said plurality of housing sections are fixedly connected to one another; said plurality of housing sections and said plurality of connectors collectively defining a unitary construction of said housing.

7. The assembly as recited in claim 1 wherein each of said plurality of connectors includes a terminal; each of said plurality of switches connected in current regulating relation between correspondingly disposed ones of said plurality of batteries and said terminals.

8. The assembly as recited in claim 7 wherein said switches are structured to variably regulate current flow from said plurality of batteries to correspondingly disposed ones of said terminals.

9. The assembly as recited in claim 7 wherein said plurality of switches are structured for independent activation of each of said terminals.

10. The assembly as recited in claim 1 wherein said plurality of housing sections, said plurality of connectors and said plurality of batteries are equal in number.

11. The assembly as recited in claim 10 wherein said plurality of housing sections, said plurality of batteries and said plurality of connectors are all at least three in number.

12. An assembly facilitating generation of consumable vapor comprising:

a housing comprising a plurality of housing sections, a plurality of power sources each disposed in a different one of said plurality of housing sections, a plurality of connectors each disposed on a different one of said housing sections, each of said plurality of connectors including a terminal, each of said terminals conductively connected to a correspondingly disposed one of said plurality of power sources, a control assembly operatively connected to each of said plurality of power sources and structured to variably and independently regulate current to each of said terminals, and each of said connectors removably attachable in current transferring relation to a different one of a plurality of vaporizable material cartridges; and said control assembly comprises a plurality of switches each operatively mounted on a different one of said housing sections in current regulating relation between correspondingly disposed ones of said plurality of batteries and correspondingly disposed ones of said terminals.

13. The assembly as recited in claim 12 wherein said plurality of housing sections are fixedly connected to one another; said plurality of housing sections and said plurality of connectors collectively defining a unitary construction of said housing.

14. The assembly as recited in claim 12 wherein said plurality of switches are structured for variable activation of each of said terminals.

15. The assembly as recited in claim 12 wherein said plurality of housing sections, said plurality of connectors and said plurality of batteries are equal in number.

16. The assembly as recited in claim 12 further comprising an access adaptor including an access opening, said access adaptor removably connected to said housing in at least partially enclosing relation to all of the vaporizable material cartridges connected to said plurality of connectors.

17. The assembly as recited in claim 16 wherein said access adaptor includes a path of fluid flow disposed and structured to direct vapor from all of the vaporizable material cartridges connected to said plurality of connectors to said access opening.

18. An assembly facilitating generation of consumable vapor comprising:

a housing including a power source and a plurality of connectors, each of said plurality of connectors structured for current transfer to a different one of a plurality of vaporizable material cartridges, a control assembly operatively connected to said power source;

said power source and said control assembly cooperatively structured to independently regulate said current transfer to each of the vaporizable material cartridges; and said control assembly comprising a plurality of switches each operatively mounted on said housing in current regulating relation to a correspondingly disposed one of said plurality of connectors.

* * * * *